United States Patent [19]

Letournel et al.

[11] Patent Number: 4,680,496

[45] Date of Patent: Jul. 14, 1987

[54] APPARATUS FOR CONVEYING ELECTROSTATIC CHARGES, IN PARTICULAR FOR VERY HIGH VOLTAGE ELECTROSTATIC GENERATORS

[75] Inventors: Michel Letournel, Strasbourg Cronenbourg; Jean-Marie Helleboid, Mundolsheim; Claude Teissier, Lingolsheim, all of France

[73] Assignee: Centre National de la Recherche Scintifique, France

[21] Appl. No.: 891,681

[22] Filed: Jul. 29, 1986

[30] Foreign Application Priority Data

Jul. 31, 1985 [FR] France ................ 85 11731

[51] Int. Cl.$^4$ ............................................. H02N 1/00
[52] U.S. Cl. ..................................... 310/308; 310/309
[58] Field of Search ............................... 310/308, 309

[56] References Cited

U.S. PATENT DOCUMENTS 3,515,909 6/1970 Trump ................................ 310/309

FOREIGN PATENT DOCUMENTS 953790 12/1949 France .
2061569 6/1971 France .

OTHER PUBLICATIONS

IEEE Transactions on Nuclear Science, vol. 14, Jun. 1967, New York.
IEEE Transactions on Nuclear Science, vol. NS-30 (1983), Aug., No. 4, Part 1, New York, USA.

Primary Examiner—L. T. Hix
Assistant Examiner—Brian W. Brown
Attorney, Agent, or Firm—Handal & Morofsky

[57] ABSTRACT

In a very high voltage electrostatic generator, the electrostatic charges are conveyed by a belt which rotates in a closed circuit between the earthed zone and the high voltage zone of the generator. According to the invention, a structure (6) offering a flat surface (60) to the belt section (5) is provided opposite the belt section (5). A gap (50) containing sulphur hexafluoride is thus formed between the structure (6) and the belt section (5). The structure (6) is made of a dielectric material (61) such as an epoxy resin which preferably contains conductive elements (62). The structure (6) is in addition traversed by tubules (63) opening on to the surface (60) so as to enable a cushion of sulphur hexafluoride to be formed in the space (50). This arrangement can operate under higher electric charge outputs than has hitherto been possible.

14 Claims, 6 Drawing Figures

APPARATUS FOR CONVEYING ELECTROSTATIC CHARGES, IN PARTICULAR FOR VERY HIGH VOLTAGE ELECTROSTATIC GENERATORS

BACKGROUND AND BRIEF DESCRIPTION OF THE INVENTION

This invention, made by the Institute of Nuclear Physics and Particle Physics at the Centre of Nuclear Research in Strasbourg, relates to the transport of electrostatic charges by mechanical means.

It is known that very high voltages can be obtained by means of electrostatic generators. To operate these generators, it is necessary to incorporate in them a device for conveying the electrostatic charges between a zone of low voltage (or earth) of the generator and the high voltage zone of the generator. This is known as the feed device of the electrostatic generator.

Electrostatic generator feed devices used at the present time are of two types:

The system of the Felici type using an insulating cylinder, which provides powerful outputs of (currents of) electrostatic charges without, however, being able to reach very high voltages; and the system of the Van de Graaff type using a flat insulating belt, which can operate up to very high voltages but provides only limited outputs or charge currents.

The second system is used for supplying electrostatic accelerators emloyed mainly for research applications in nuclear physics. For other, more recent applications, it is desirable to be able to obtain both a high output or charge current and a very high voltage. This problem has not so far been resolved satisfactorily in Van de Graaff generators.

In these electrostatic accelerators, the distribution of electric field between the zone of very high voltage and the zone of very low voltage or earth voltage is controlled by separate devices such as gradient bars. The feed device, as well as other parts of the accelerator, are located in a gaseous atmosphere consisting mainly of sulphur hexafluoride. These gradient bars are placed on either side of each section of the belt, namely the ascending and descending section. The position of equilibrium of each belt section between the gradient bars surrounding them is, however, unstable. When attempts are made to increase the density of electric charges or, more precisely, the net balance of electric charges transported by each section of the belt, the belt is subject to mechanical instabilities which give rise to disturbances such as vibrations, premature wear and even breakdown.

The present invention seeks to provide a solution to the problem of increasing the charge output.

The proposed device for conveying the electrostatic charges is of the type comprising, inside a gaseous atmosphere:

A flat insulating belt turning in a closed circuit between an earthed zone and a high voltage zone which are spaced apart, means for depositing electric charges on the belt in the earthed zone, means for extracting electric charges from the belt in the high voltage zone and two structures placed close to each section of the belt between the high voltage zone and the earthed zone to control the gradient of the electric field along the belt between these two zones.

According to a first feature of the invention, each of the structures placed close to each section of the belt extends continuously along the whole length of its particular section of belt and is non-conductive in the direction of displacement of the belt. This structure comprises, on the side facing the belt, a flat surface where it is designed to produce a cushion of ambient gas between itself and the belt.

In practice, the distance between the belt and the said flat surface is less than a millimeter.

According to another feature of the invention, each structure consists mainly of an epoxy resin equipped on the side of the belt with orifices placed at more or less regular intervals apart and supplied with ambient gas to produce a substantially uniform pressure at the orifice outlets. This enables the aforesaid air cushion to be produced.

The mean distance between adjacent orifices is advantageously several centimeters while the diameter of each orifice is of the order of a millimeter.

In a first embodiment of the invention the structure contains elongated conductive elements placed perpendicularly to the direction of movement of the belt and arranged at regular intervals along the belt and parallel to the plane of the belt.

These conductive elements may end flush with the surface of the insulating structure opposite the belt.

In one variation, the conductive elements are embedded at a selected depth within the volume of the insulating structure.

The feed tubules of the orifices advantageously extend at least in part to the inside of the said conductive elements.

In cross-section, the conductive elements are preferably so designed that they minimize the distortions of the local electric field created by their presence in the vicinity of the belt.

In another embodiment of the invention, the said structure is made of an insulating material which is homogeneous but rendered slightly conductive within its volume.

Inside the structure, the feed tubules of the orifices are advantageously inclined at an angle to the direction of movement of the belt. In the preceding embodiment, the portion of tubules extending through the insulating material is also advantageously set at an angle to the direction of movement.

According to another feature of the invention, the dielectric constant of the epoxy resin is approximately 5 to 8.

The two structures are preferably arranged each on the outside of its respective section of the belt.

The invention applies in particular to cases in which the ambient gas used is sulphur hexafluoride.

Other features and advantages of the invention will be apparent from the detailed description given below with reference to the attached drawings, as briefly described below.

DETAILED DESCRIPTION OF THE INVENTION

Figure 1:
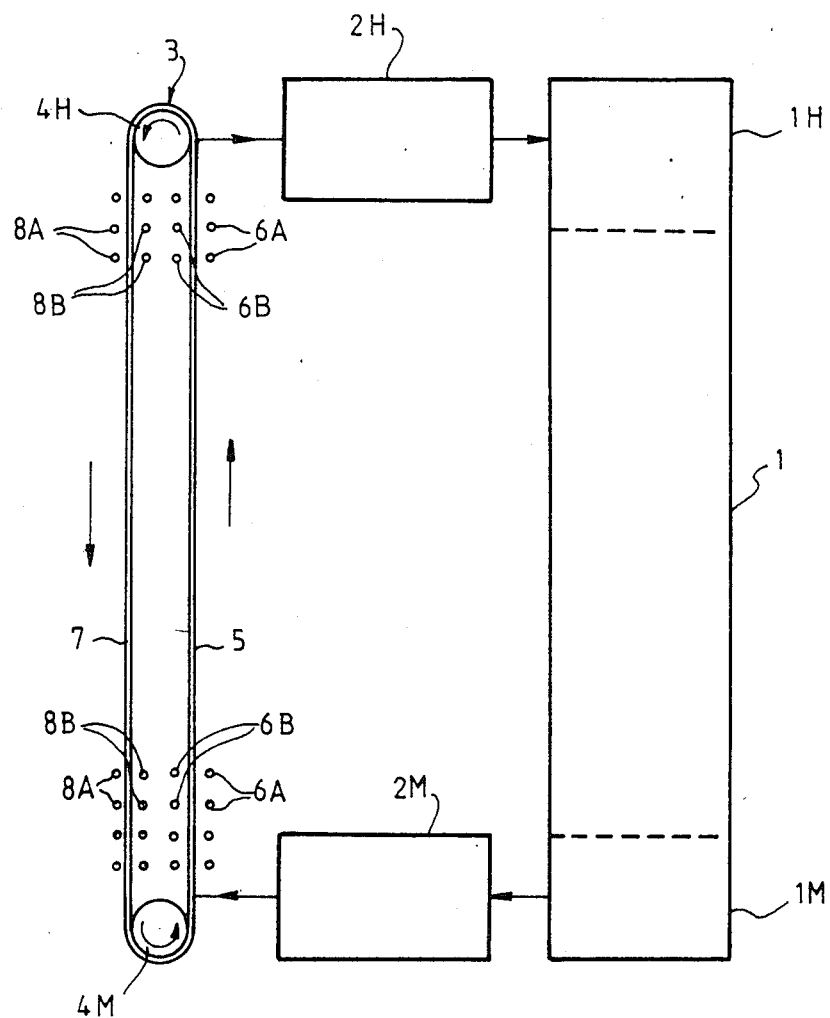
FIG. 1 is a very simplified overall plan of an electrostatic generator with its feed device using a belt.

FIG. 1 shows an electrostatic generator 1 having a part at earth potential 1M and a part at very high potential 1H at its other end. The generator may be mounted vertically or horizontally. The internal structure (not shown) of the electrostatic generator 1 may be similar, for example, to that described in the French Patent Application published under the number 2 498 040.

To produce a high voltage, it is necessary to pass electric charges from the earthed zone 1M of the generator to the very high voltage zone 1H.

For very high voltages, electric charges are mainly conveyed mechanically by means of a belt indicated by the reference 3. This belt 3, which is normally flat and insulating, moves in a closed cycle (circuit) between the lower roller 4M and the upper roller 4H.

A device 2M placed between the earthed zone 1M of the generator and the lower part of the belt provides for the deposition of electric charges on one of the sections of the belt. Another device 2H in the upper part extracts electric charges from the belt to transfer them to the very high voltage part 1H of the generator.

Substantially the same electric field then exists between the upper part and the lower part of the belt as between the very high voltage zone 1H of the generator and its earthed zone 1M. The whole arrangement of devices described above is located in an atmosphere of a gas such as sulphur hexafluoride which has good disruptive characteristics.

It is known to use so-called gradient bars to control the distribution of the electric field along the belt.

FIG. 1 shows gradient bars 6A and 6B on either side of the ascending section 5 of the belt to ensure the transfer of charges between the device 2M and the device 2H. Similar gradient bars 8A and 8B are provided on either side of the descending section 7 of the belt 3.

This arrangement has hitherto proved satisfactory in electrostatic generators where it is generally not necessary to transmit a high output of electric charges, that is to say a powerful electric current between the earthed zone 1M and the very high voltage 1H of the accelerator. It should be remembered, however, that the feed belt is frequently a source of breakdown of an electrostatic accelerator.

It may be noted that each section of the belt travels between gradient bars situated on either side of the belt. If one assumes that the overall charge of this section of the belt is positive then these charges will create lines of force which will close up again either on the right or left of the gradient bars. When the belt is exactly equidistant between the bars on the righthand side and the bars on the lefthand side (assuming a symmetrical structure), then the electric field is identical on the right and left. A position of equilibrium will then prevail. However, the belt, like any mechanical device, is subject to minor displacements about its central position. When a displacement of the section of belt causes this section to move away from its central position and closer to the gradient bars situated on one side, an instability will become apparent since the electric field then tends to increase the distance between the belt and its central position.

It is then found that the belt tends to place itself flat up against the gradient bars either on the right or on the left. The greater the charges carried by the belt, the more strongly will the belt rub up against these bars. The man of the art knows well that this gives rise to all sorts of difficulties, not the least of which is the wear and tear on the belt due to friction against the gradient bars.

As a result of these phenomena, the transport of charges by belt has hitherto been considered to be very difficult to apply for systems of high outputs or currents although the use of the belt is a necessary measure for producing very high voltages.

Instead of using gradient bars arranged on either side of each belt section, the invention provides that a continuous structure which is non-conductive in the direction of the belt be provided on one side of each belt section. Moreover, this structure has a flat surface on the side of the belt, where it is designed to produce a cushion of ambient gas such as sulphur hexafluoride between itself and the belt.

The possibility of obtaining a very high voltage is preserved by using a linear element such as the belt. The belt is maintained at a very small distance from the aforesaid surface of the continuous structure to enable charges to be conveyed at a high density, which is all the higher the thinner the layer of film of gas, according to the law of disruption of the particular gas.

The composition and form of the structure are designed to minimize the distortions of the local electric field which may occur in the vicinity of the belt due to the geometrical configuration of the structure so that a more favourable law of disruption may be obtained since this will be all the better the more the distortions are reduced.

Figure 2:
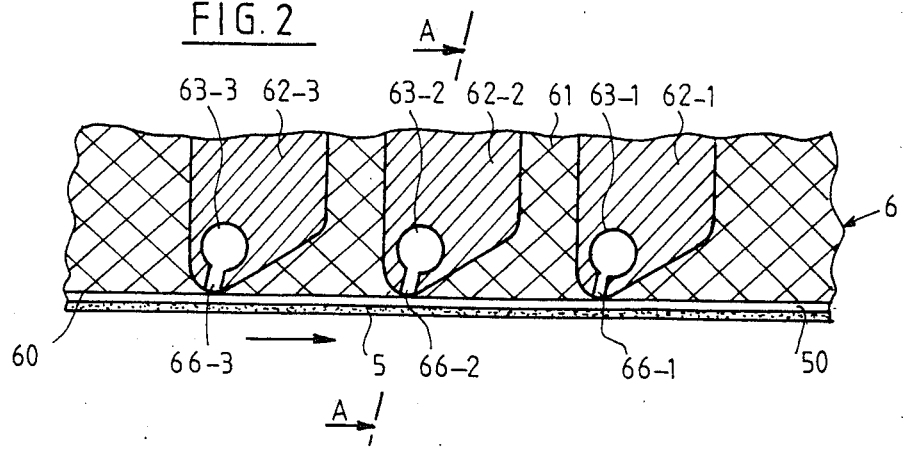
FIG. 2 is a schematic view, partly in section, of a first embodiment of the invention.
Figure 3:
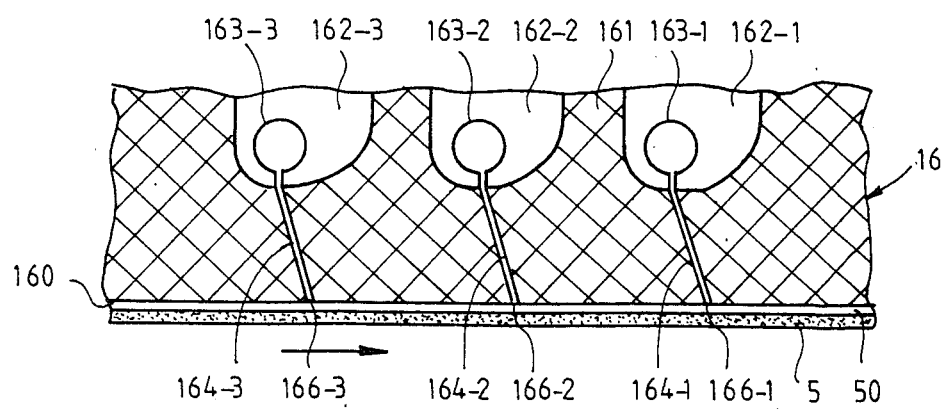
FIG. 3 is a schematic section of part of a second embodiment of the invention.
Figure 4:
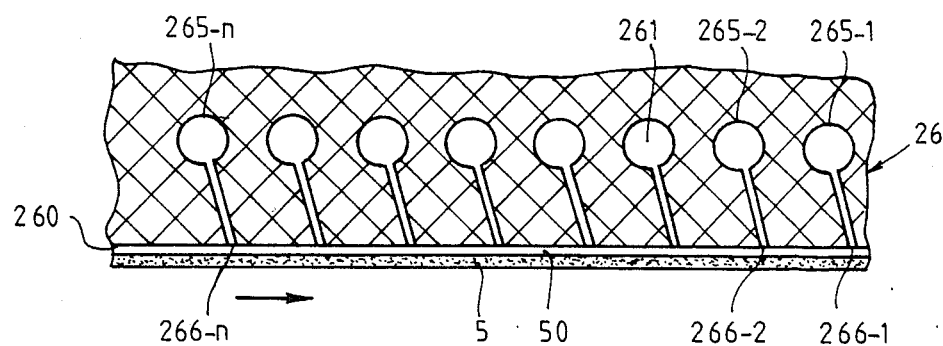
FIG. 4 is a schematic section of part of a third embodiment of the invention.

Three embodiments of the invention are illustrated in FIGS. 2 to 4. These figures are partial representations of a belt section and of the structure facing one side of the belt, which would normally be the outside of the belt.

The section illustrated is the ascending section 5 and it is assumed to carry a density of positive charges. The potential thus increases from left to right.

In FIG. 2, the structure 6 situated opposite the section 5 has a flat surface 60 in the immediate vicinity of the belt section. The distance between the belt and the flat surface 60 is of the order of a millimeter or several millimeters.

Figure 2A:
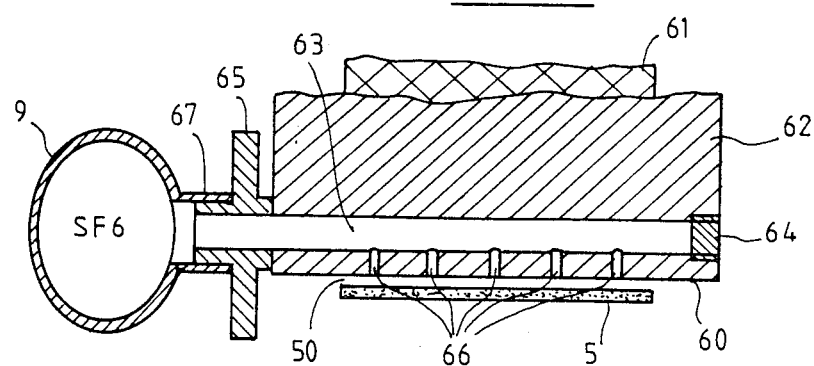
FIGS. 2A and 2B are a partial sectional view (line A—A of FIG. 2) and a partial view in perspective illustrating how the cushion of gas may be produced.
Figure 2B:
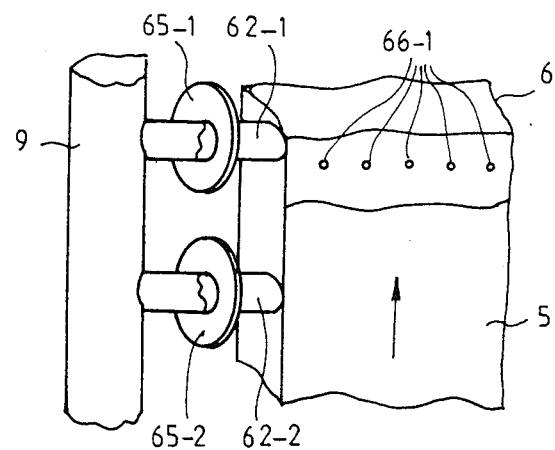

The structure 6 consists of an epoxy resin having a dielectric constant preferably in the region of about 5 to 8. It contains conductive bars 62-1, 62-2, 62-3 embedded in the matrix of the epoxy resin 61 and extending transversely to the direction of movement of the belt 5. These bars extend beyond the matrix 61 on either side (FIGS. 2A and 2B). They are placed with their large dimension parallel to the surface 60.

Gas distribution tubes 63-1 to 63-3 pass transversely through the structure 6, preferably extending through the conductive bars 62-1 to 62-3 in their major dimension. Each tube 63 distributes gas to side tubules 66 opening on to the surface 60 by orifices having a diameter of the order of a millimeter while the average distance between adjacent orifices may be several centimeters. The distribution of orifices on the surface 60 need not be strictly regular since a statistically balanced distribution of orifices may be sufficient to produce a cushion of gas.

The tubes 63-1 to 63-3 are under an excess pressure of ambient gas which enables the gas cushion 50 to form in the space between the surface 60 and the upper surface of the belt section 5.

One arrangement for obtaining the gas cushion is illustrated in FIGS. 2A and 2B which in this respect supplement FIG. 2.

Each tube 63 is closed at one end, for example by a plug 64. A disc 65 screwed to the other end of the tube is perforated in the axial direction to enable the tube 63 to communicate at 67 with a pipe 9 (for example a pipe made of Rilsan, Registered Trade Mark) which conducts $SF_6$ under pressure to various tubes 63. The tubes 63 and discs 65 are made of metal, for example stainless steel.

The discs of form spark gaps between themselves in the direction of movement of the belt 5, as shown between 65-1 and 65-2 (FIG. 2B). The pipe 9 extends along the side of the structure 6 in the direction of movement of the belt 5.

In one exemplary embodiment (50 kV between bars), the bars 62 which have a width of 1 cm are placed at intervals of 2.5 cm with a space of 1.5 cm between bars. The spark devices 65 are discs having a thickness of 6 mm with an external diameter of 22 mm on their rounded periphery (for the sake of clarity, the figures are not drawn to this scale).

The arrangement according to the invention enables the dielectric belt 5 to be placed at a very small distance from the structure 6 according to the invention in the gas. This is an advantage since the smaller this distance the more easily can the appearance of disruptive fields in this gap be avoided.

When the charge conveyed by the belt section 5 tends to increase, a force of attraction is produced between this section 5 and the structure 6 facing it, as already mentioned above. However, since the pressure in the cushion of gas in the space 50 increases as the aforesaid distance decreases, a force of repulsion will be produced which tends to compensate for the force of attraction between the belt 5 and the structure 6. Consequently and contrary to what has been possible in the prior art, a position of stable equilibrium can now be obtained for the belt section 5 in relation to the surface 60 of the structure 6 with a very small space between these parts.

FIG. 3 illustrates a second embodiment of the invention, again showing the belt section 5 and the space 50.

The structure facing the belt section 5, now marked by the reference numeral 16, has a surface 160 on the side facing the section 5. The bars 162-1 to 162-3 are again embedded in the dielectric resin 161 but at some distance from the surface 160.

The distributor tubes, now marked by the reference numerals 163-1 to 163-3, extend through the conductive bars 162. The gas flows to the surface 160 through tubules 164 which are preferably set at a slope, as illustrated.

The sloping arrangement of the tubules inside the resin provides for a better functioning of the whole apparatus with regard to the establishment of lines of force (electric field) between the belt section 5 and the conductive elements 162. The air cushion may alternatively be obtained as in the first embodiment (FIGS. 2A and 2B).

In the two embodiments described above, the structures 6 and 16 are heterogeneous. Distortions may therefore occur in the electric field at the level of the interval 50 between the structure and the belt section 5.

It is found possible to choose the form of the bars 62 or 162 on the side facing the belt section so as to minimize these distortions of the electric field. This also helps to improve the characteristics of disruption in the gap 50.

With this in view, and particularly in their illustration of the shapes, the appended drawings are incorporated with the description not only to enable the invention to be more easily understood but also to contribute to the definition of the invention.

An inspection of FIG. 2 will show that in profile the elements 62 are rounded off on the upstream side of the belt until they meet the surface 60. From then on, the profile moves progressively further away from the surface 60.

Furthermore, the elements 62 are in the form of prisms based on the contour illustrated in FIG. 2. Opposite the belt, these elements may have a contour similar to that currently in use for gradient bars.

In FIG. 3, the end of each element 162 on the side facing the belt is similar to that of the elements 62 of FIG. 2 but more rounded off. This is possible in this case because the distance between the elements 162 and the surface 160 is sufficiently large so that the distortions induced in the electric field in the gap 50 by the existence of these elements are less marked.

FIG. 4 shows another embodiment of the invention, in which the structure, now indicated by the reference numeral 26, is homogeneous, at least on a macroscopic scale.

This structure is composed of an epoxy resin 261 which is insulating but rendered partially conductive within its volume by a suitable charge in the epoxy resin, which is conventional.

Care must be taken, however, to ensure that this conductive charge in the resin 261 does not produce too great a conductivity in the structure 26 in the direction of movement of the belt 5.

Distributors 265-1 to 265-n are again provided in the structure 26 to supply tubules 266-1 to 266-n which open on to the surface 260 opposite the belt 5 to produce a cushion of gas in the space 50. In this case it is again preferable to arrange the tubules 266 at an angle to the direction of movement of the belt 5 to prevent difficulties caused by the presence of gas tubes extending the space 50 to the interior of the structure 26.

The supply of gas may be arranged as illustrated in FIGS. 2A and 2B but without the metal sparking devices. One variation consists of supplying the tubes 265 with gas from a laterally placed tank put under a pressure of SF6. This variation may be applied to the preceding embodiments.

The apparatus according to the invention may be used to supply an electrostatic generator to enable it to deliver high outputs or electric currents under very high voltages.

The invention may be used for all industrial applications of electrostatic generators, both as such and as components of more complex systems such as electrostatic accelerators and more particularly for applications requiring high powers.

The invention in particular enables the output of existing electrostatic accelerators to be increased.

It also enables electrostatic generators to be constructed for various applications, such as the purification of water.

It is to be understood that the invention is not limited to the embodiments described. Means equivalent to those mentioned above may be employed. In particular, the term "insulating flat belt" does not exclude the possibility of the belt containing conductive inclusions, provided the belt on the whole remains insulating along its length.

We claim:

1. In or for apparatus for conveying electrostatic charges within an ambient gas atmosphere, in particular for very high voltage electrostatic generators, of the type comprising :
   (a) a flat insulating belt (3) movable in a closed cycle between an earthed or low voltage zone (1M) and a very high voltage zone (1H), the zones being spaced apart from one another, sections of the belt moving towards or away from a respective zone;
   (b) means (2M) for depositing electric charges on the belt in the earthed zone;
   (c) means (2H) for extracting electric charges from the belt in the high voltage zone; and
   (d) two structures (6,8) respectively placed close to each belt section between the two zones for the purpose of controlling the electric field along the belt between the said zones,
the improvement wherein each of these structures (6, 16, 26) extends continuously along a length of the respective belt section (5), each structure being of insulating or non-conductive material in the direction of movement of the belt, and wherein each structure comprises, on its side facing the belt, a flat surface (60, 160, 260) designed to produce a cushion (50) of ambient gas between itself and the belt.

2. The improvement of claim 1, wherein the belt (5) and the said flat surface (60, 160, 260) are separated by a gap of several millimeters.

3. The improvement of claim 1 wherein each of the structures (6, 16, 26) consists principally of an epoxy resin, each of the structures having on its side facing the belt orifices spaced apart at more or less regular intervals (66, 166, 266), the orifices being connected to a supply of ambient gas to produce a substantially uniform gas pressure at the outlet of the orifices.

4. The improvement of claim 1, wherein adjacent orifices (66, 166, 266) are spaced by a mean distance of several centimetres, the diameter of these orifices being of the order of one millimeter.

5. The improvement of claim 3, wherein the structure contains longitudinal conductive elements (62, 162) these conductive elements being placed perpendicularly to the direction of movement of the belt and arranged at regular intervals in this said direction and parallel to the plane of the belt.

6. The improvement of claim 5, wherein the conductive elements (62) end flush with that surface of the structure on the side facing the belt.

7. The improvement of claim 5, wherein the conductive elements (162) are embedded at a chosen depth within the volume of the structure.

8. The improvement of claim 5, wherein the said conductive elements have tubules (63, 163) joined to the orifices and which extend to the interior of the respective conductive elements.

9. The improvement of claim 5, wherein the conductive elements (62, 162) have a profile in cross-section chosen to minimise the distortions which their presence creates in the local electric field in the vicinity of the belt.

10. The improvement of claim 3, wherein the structure (26) is made of an insulating material with means whereby it is rendered slightly conductive within its volume.

11. The improvement of claim 8, wherein the tubules (164, 265) within the insulating structure and joined to the orifices are inclined at an angle to the direction of movement of the belt.

12. The improvement of claim 3, wherein the dielectric constant of the epoxy resin is approximately 5 to 8.

13. The improvement of claim 1, wherein the two structures (6, 16, 26) are arranged one each on the external side of the respective belt section.

14. The improvement of claim 1, wherein the ambient gas is sulphur hexafluoride.

* * * * *